(12) United States Patent
Mizukane

(10) Patent No.: US 11,433,586 B2
(45) Date of Patent: Sep. 6, 2022

(54) INJECTION MOLD AND MANUFACTURING METHOD

(71) Applicant: Konica Minolta, Inc., Tokyo (JP)

(72) Inventor: Takahiro Mizukane, Yokohama (JP)

(73) Assignee: KONICA MINOLTA, INC., Tokyo (JP)

( * ) Notice: Subject to any disclaimer, the term of this patent is extended or adjusted under 35 U.S.C. 154(b) by 121 days.

(21) Appl. No.: 16/936,979

(22) Filed: Jul. 23, 2020

(65) Prior Publication Data

US 2021/0031421 A1 Feb. 4, 2021

(30) Foreign Application Priority Data

Aug. 2, 2019 (JP) .............................. JP2019-143230

(51) Int. Cl.
*B29C 45/40* (2006.01)
*B29C 45/26* (2006.01)

(52) U.S. Cl.
CPC ........ *B29C 45/401* (2013.01); *B29C 45/2602* (2013.01); *B29C 2045/4063* (2013.01); *B29K 2905/02* (2013.01); *B29K 2995/0012* (2013.01)

(58) Field of Classification Search
CPC .............. B29C 45/401; B29C 40/4005; B29C 2045/4063; B29C 45/44; B29C 45/2602; B29K 2905/02; B29K 2995/0012
See application file for complete search history.

(56) References Cited

U.S. PATENT DOCUMENTS

| 4,571,171 | A | * | 2/1986 | Blank | B29C 45/332 |
| | | | | | 425/533 |
| 4,889,311 | A | * | 12/1989 | Anglin | B29C 33/442 |
| | | | | | 425/444 |
| 5,281,121 | A | * | 1/1994 | Tsutsumi | B29C 45/2602 |
| | | | | | 425/436 R |
| 5,733,585 | A | * | 3/1998 | Vandewinckel | |
| | | | | | B29D 11/00432 |
| | | | | | 425/808 |
| 5,817,208 | A | * | 10/1998 | Nose | B29C 45/372 |
| | | | | | 156/581 |
| 5,914,136 | A | * | 6/1999 | Han | B29C 45/2608 |
| | | | | | 425/117 |
| 6,354,560 | B1 | * | 3/2002 | Kawasaki | B29C 45/374 |
| | | | | | 425/173 |
| 7,497,677 | B1 | * | 3/2009 | Crian | B29C 33/306 |
| | | | | | 425/185 |
| 11,014,274 | B2 | * | 5/2021 | Halford | B29C 43/36 |

(Continued)

FOREIGN PATENT DOCUMENTS

JP H09-123225 A 5/1997

OTHER PUBLICATIONS

James Carvill, Mechanical Engineer's Data Handbook, 1993, Elsevier, pp. 264-265. (Year: 1993).*

(Continued)

*Primary Examiner* — Niki Bakhtiari
*Assistant Examiner* — Emmanuel S Luk
(74) *Attorney, Agent, or Firm* — Lucas & Mercanti, LLP

(57) ABSTRACT

At a temperature at the time of molding, an end surface of an ejector pin in a sliding direction is as high as or higher than an upper surface of an upper surface portion of a mold body, the upper surface being adjacent to a cavity on the ejector pin side.

8 Claims, 7 Drawing Sheets

(56) References Cited

U.S. PATENT DOCUMENTS

| | | | | |
|---|---|---|---|---|
| 2002/0041911 A1* | 4/2002 | Mine | B29C 45/14655 | 425/577 |
| 2003/0141616 A1* | 7/2003 | Coel | B29C 45/376 | 264/40.5 |
| 2006/0115551 A1* | 6/2006 | Peukert | B29C 33/3828 | 425/468 |
| 2007/0007696 A1* | 1/2007 | Weymouth, Jr. | B29C 45/376 | 264/328.1 |
| 2007/0031532 A1* | 2/2007 | Chen | B29C 45/2673 | 425/555 |
| 2007/0286918 A1* | 12/2007 | Crain | B29C 45/2673 | 425/175 |
| 2010/0183761 A1* | 7/2010 | Iwami | B29C 33/3842 | 425/547 |
| 2011/0115117 A1* | 5/2011 | Desmith | B29C 44/428 | 425/192 R |
| 2011/0311664 A1* | 12/2011 | Kimura | B29C 45/401 | 425/3 |
| 2011/0311665 A1* | 12/2011 | Kimura | B29C 33/442 | 425/444 |
| 2012/0074606 A1* | 3/2012 | Betz | B29C 45/2628 | 425/153 |
| 2015/0190953 A1* | 7/2015 | Fujita | B29C 45/0001 | 525/240 |
| 2016/0144544 A1* | 5/2016 | Gary Lee | B29C 45/401 | 425/444 |
| 2016/0207239 A1* | 7/2016 | Halford | B29C 45/4005 | |
| 2016/0346954 A1* | 12/2016 | Yeo | B28B 7/42 | |
| 2019/0091909 A1* | 3/2019 | Fontaine | B29C 33/3842 | |
| 2021/0268702 A1* | 9/2021 | Okahara | B29C 45/376 | |

OTHER PUBLICATIONS

The Engineering Toolbox, Thermal Expansion—Linear Expansion Coefficients, Linear temperature expansion coefficients for common materials like aluminum, copper, glass, iron and many more, 2022, https://www.engineeringtoolbox.com/linear-expansion-coefficients-d_95.html see pp. 1-4. (Year: 2022).*

CNIPA, Office Action for the corresponding Chinese patent application No. 202010743240.6, dated Apr. 26, 2022, with English translation.

* cited by examiner

INJECTION MOLD AND MANUFACTURING METHOD

CROSS-REFERENCE TO RELATED APPLICATION

Japanese patent application No. 2019-143230 filed on Aug. 2, 2019, including description, claims, drawings, and abstract the entire disclosure is incorporated herein by reference in its entirety.

BACKGROUND

1. Technological Field

The present invention relates to an injection mold and a manufacturing method.

2. Description of the Related Art

An image forming apparatus is made up of resin members of various shapes. Therefore, in the manufacturing of the image forming apparatus, in accordance with demands for increasing the number of types, reducing the amount, and shortening the life cycle, the need is increasing for an injection mold that can be manufactured at a low cost with a short delivery time.

The injection mold has conventionally been manufactured by machining steel, but in recent years, due to demands for reducing the cost and shortening the delivery time, an aluminum alloy with good processability and thermal conductivity has been used as a material for the injection mold.

A JIS (Japanese Industrial Standard)-A7075 material with the highest mechanical strength is often used as the aluminum alloy material, but even when this material is used, the strength is inferior and the durability is low as compared to those of the steel. Hence it is known that, of a sliding surface of a movable-side member with an ejector pin, wear occurs at a corner intersecting with an adjacent surface adjacent to a cavity in the movable-side member in association with contact with the ejector pin.

When injection molding is performed using an injection mold in which wear has occurred at the corner of the movable-side member, a protrusion (burr) corresponding to the wear is formed in a molded article, and especially when the molded article is used as the paper feeder of the image forming apparatus, there is a possibility that paper may be damaged by the protrusion.

In this connection, for example, Japanese Patent Application Laid-Open No. 9-123225 discloses an injection mold in which a hard alumite coating is formed on a sliding surface of a movable-side member with an ejector pin, and by hard alumite treatment, the hardness of the sliding surface is improved, enabling reduction of wear caused by sliding of the ejector pin.

SUMMARY

However, as for the mold disclosed in Japanese Patent Application Laid-Open No. 9-123225, the treatment cost for the hard alumite treatment increases, and the delivery time is extended, thus deviating from the original purpose of using the aluminum alloy (low cost and short delivery time). Further, since the dimension of the hole of the movable-side member in which the ejector pin slides changes due to the hard alumite treatment, the management of the dimension becomes complicated, which is not preferred.

The present invention has been made to solve the above problems, and an object of the present invention is to provide an injection mold capable of reducing a change in mold size at a low cost and preventing the occurrence of wear at a corner of a movable-side member.

To achieve at least one of the abovementioned objects, according to an aspect of the present invention, an injection mold reflecting one aspect of the present invention comprises a mold body that includes a fixed-side member and a movable-side member and in which a cavity is formed; and an ejector pin, wherein said mold body and said ejector pin have linear expansion coefficients different from each other, and at a temperature at a time of molding, an end surface of said ejector pin on said cavity side in a sliding direction is as high as or higher than an adjacent surface of said movable-side member, said adjacent surface being adjacent to said cavity.

Moreover, to achieve the above-mentioned object, according to an aspect of the present invention, a manufacturing method of manufacturing a molded article reflecting one aspect of the present invention by using above injection mold.

The objects, features, and characteristics of this invention other than those set forth above will become apparent from the description given herein below with reference to preferred embodiments illustrated in the accompanying drawings.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
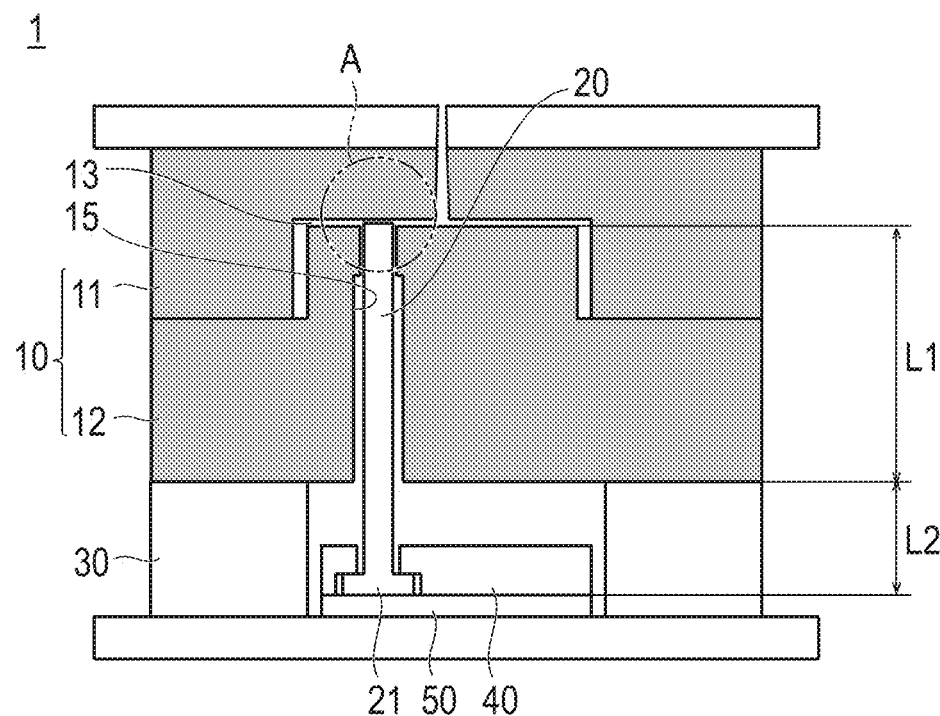
FIG. 1 is a schematic view illustrating an injection mold at a temperature at the time of mold assembly according to an embodiment of the present invention.

Hereinafter, one or more embodiments of the present invention will be described with reference to the drawings. However, the scope of the invention is not limited to the disclosed embodiments.

An embodiment of the present invention will be described with reference to FIGS. 1 to 4. In the description of the drawings, the same elements are denoted by the same reference numerals, and redundant description will be omitted. The dimensional proportions of the drawings are exaggerated for convenience of description and may differ from the actual proportions.

Figure 2:
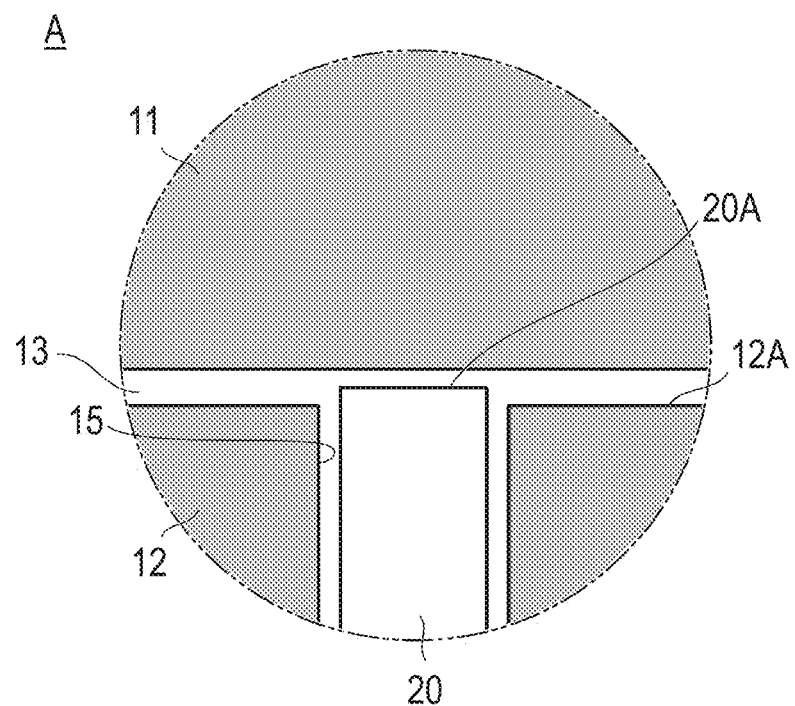
FIG. 2 is an enlarged view of a section A in FIG. 1.
Figure 3:
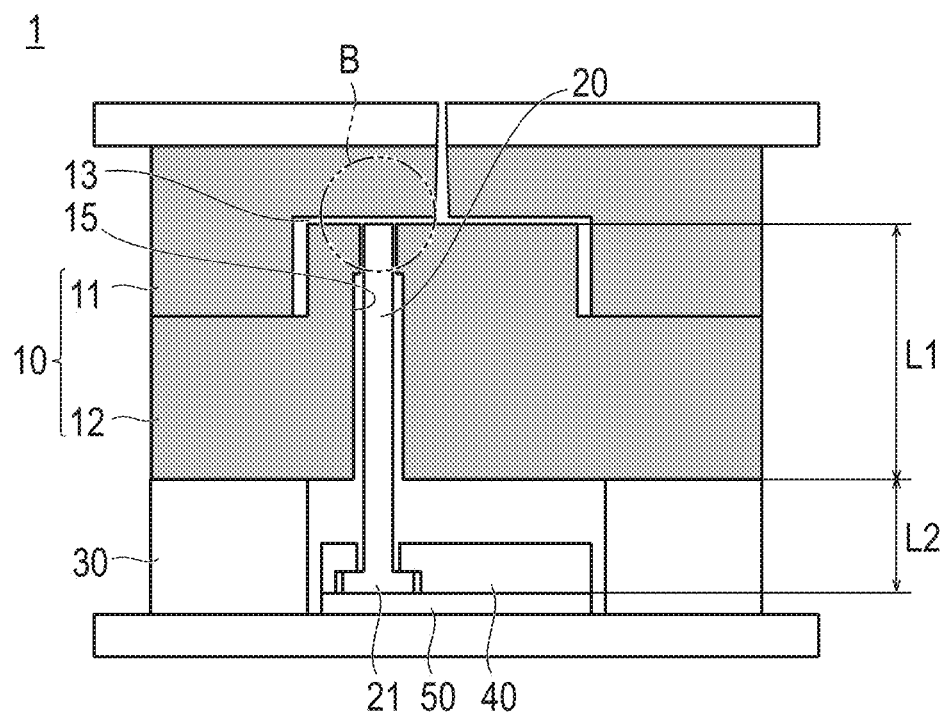
FIG. 3 is a schematic view illustrating the injection mold at a temperature at the time of molding according to the present embodiment.
Figure 4:
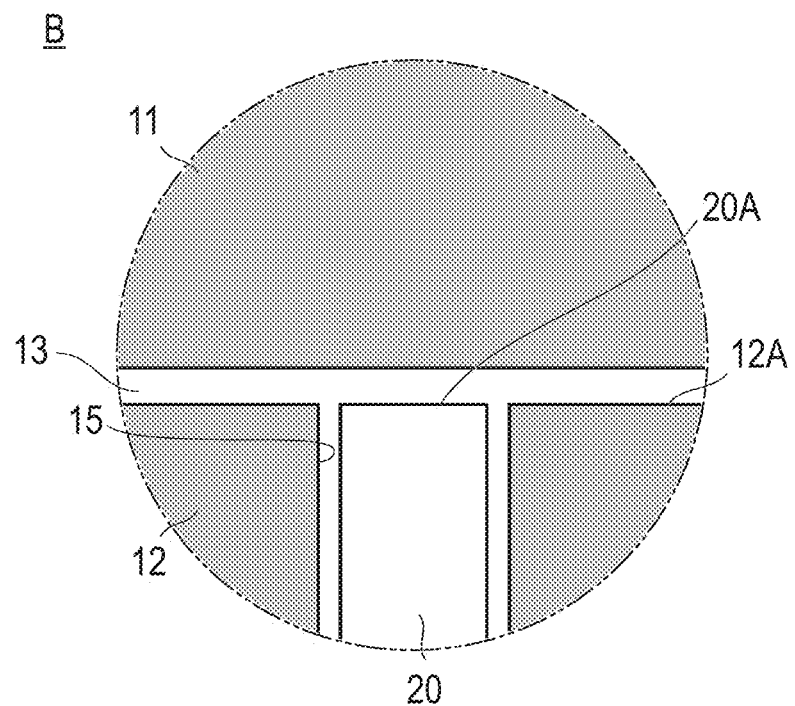
FIG. 4 is an enlarged view of a section B in FIG. 3.

FIG. 1 is a schematic view illustrating an injection mold 1 at a temperature Ta at the time of mold assembly according to an embodiment of the present invention. FIG. 2 is an enlarged view illustrating a section A in FIG. 1. FIG. 3 is a schematic view illustrating the injection mold 1 at a temperature Tm at the time of molding according to the present embodiment. FIG. 4 is an enlarged view illustrating a section B in FIG. 3.

As a result of diligent studies by the present inventors, it was found that the occurrence of wear 12C at a corner of a movable-side member 12 is caused not only by the low hardness of the aluminum alloy but also by the difference in linear expansion coefficient between an aluminum alloy and steel. That is, the linear expansion coefficient of the steel used for an ejector pin 20 is 11 to $12 \times 10^{-6}$/K. On the other hand, the linear expansion coefficient of the aluminum alloy used for a fixed-side member 11 and a movable-side member 12 is 23 to $24 \times 10^{-6}$/K, which is about twice that of the steel. Due to this difference in linear expansion coefficient, even when an end surface 20A of the ejector pin 20 on a cavity 13 side in the sliding direction is as high as the adjacent surface 12A of the movable-side member 12 which is adjacent to the cavity 13 at the temperature at the time of assembly, when the temperature is raised at the time of molding, the end surface 20A of the ejector pin 20 comes into the state of being lower than the adjacent surface 12A of the movable-side member 12 due to the difference in linear expansion coefficient between the steel and the aluminum alloy. It was found that, when the ejector pin 20 is slid in this state, the outer periphery of the end surface 20A of the ejector pin 20 comes into contact with the corner of the movable-side member 12, a large stress is locally applied to the corner of the movable-side member 12, and the wear 12C occurs.

As illustrated in FIGS. 1 to 4, the injection mold 1 has a mold body 10, an ejector pin 20, and a support member 30. The injection mold 1 is used for manufacturing of a part of an image forming apparatus, for example.

In the injection mold 1, a molded article 90 is manufactured by the following procedure. First, a relatively high-temperature resin in a molten state is press-fitted into the cavity 13 formed in the mold body 10, and the cavity 13 is filled with the resin in the molten state. After the resin in the cavity 13 is cooled and solidified, the molded article 90 is taken out by the ejector pin 20.

As illustrated in FIG. 1, the mold body 10 has the fixed-side member 11 disposed above, and the movable-side member 12 disposed below the fixed-side member 11.

The fixed-side member 11 is configured with its position fixed. The movable-side member 12 is configured to be movable in the vertical direction. That is, the movable-side member 12 is configured to be able to approach and separate from the fixed-side member 11.

The cavity 13 is formed between the fixed-side member 11 and the movable-side member 12. In the following description, the surface of the movable-side member 12 which is adjacent to the cavity 13 is referred to as the adjacent surface 12A. As illustrated in FIG. 1, the movable-side member 12 has a through hole 15 penetrating along the vertical direction.

As illustrated in FIG. 1, in the vicinity of the upper end of the through hole 15, the diameter is set so that the ejector pin 20 slides without a gap in order to prevent the resin in the cavity 13 from leaking into the through hole 15. On the other hand, below the upper end, the diameter of the through hole 15 is slightly large as compared to that of the upper end so as to provide an appropriate clearance with the ejector pin 20.

The material constituting the fixed-side member 11 and the movable-side member 12 is the aluminum alloy. The linear expansion coefficient of the aluminum alloy is, for example, 23.6 to $23.8 \times 10^{-6}$/K.

Figure 7:
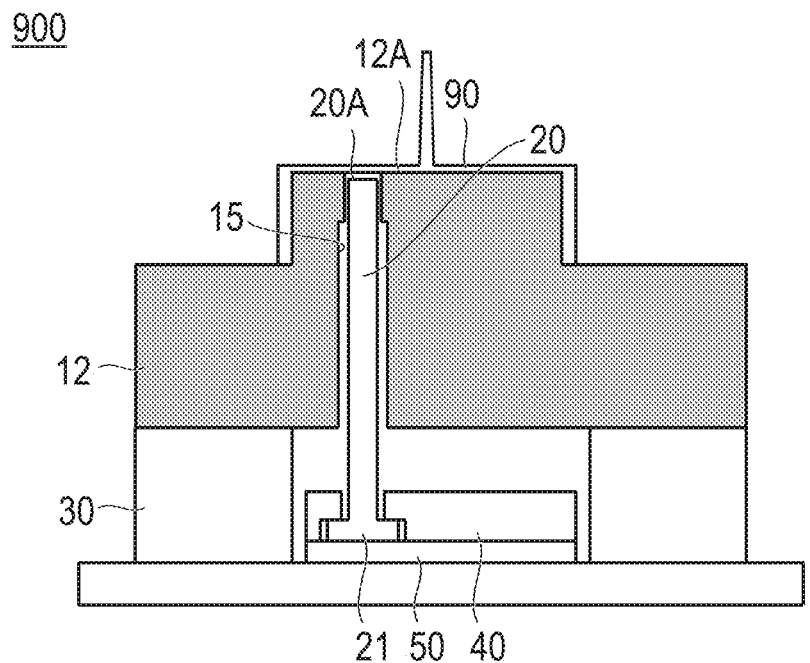
FIG. 7 is a schematic view illustrating the injection mold according to a comparative example, and a state in which an ejector pin is returned.
Figure 8:
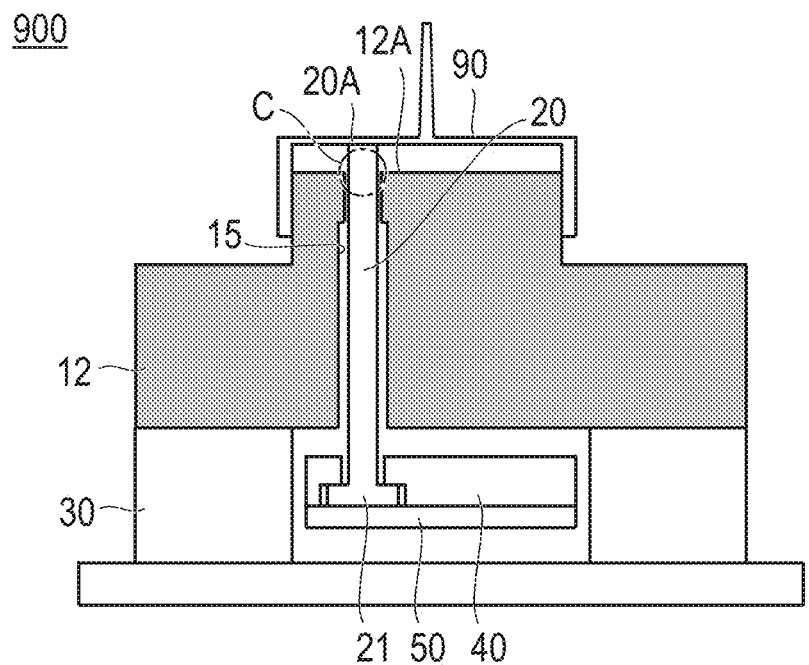
FIG. 8 is a schematic view illustrating the injection mold according to a comparative example, and a state in which the ejector pin releases a molded article.

After completion of injection molding, the movable-side member 12 moves downward and separates downward from the fixed-side member 11, and thereafter, the ejector pin 20 moves upward when an ejector plate 50 moves upward with respect to the movable-side member 12 Then, the ejector pin 20 releases the molded article 90 from the movable-side member 12 (cf. FIGS. 7 and 8).

The ejector pin 20 is disposed to be inserted into the through hole 15 of the movable-side member 12.

The end surface 20A of the ejector pin 20 on the cavity 13 side (upper side) in the vertical direction (sliding direction) is higher than the adjacent surface 12A of the movable-side member 12 at the temperature Ta at the time of mold assembly as illustrated in FIGS. 1 and 2.

Further, the upper end surface 20A of the ejector pin 20 is as high as the adjacent surface 12A of the movable-side member 12 at the temperature Tm at the time of molding as illustrated in FIGS. 3 and 4. Note that the present invention also includes a configuration in which the upper end surface 20A of the ejector pin 20 is higher than the adjacent surface 12A of the movable-side member 12 at the temperature Tm at the time of molding.

When the upper end surface 20A of the ejector pin 20 is higher than the adjacent surface 12A of the movable-side member 12 at the temperature Tm at the time of molding, the difference in height in the sliding direction between the upper end surface 20A of the ejector pin 20 and the adjacent surface 12A of the movable-side member 12 is preferably one-tenth or less of the thickness of the molded article 90. When the thickness of the molded article 90 is, for example, 2 mm, the difference in height in the sliding direction between the upper end surface 20A of the ejector pin 20 and the adjacent surface 12A of the movable-side member 12 is preferably 0.2 mm or less.

For example, when the difference in height in the sliding direction between the upper end surface 20A of the ejector pin 20 and the adjacent surface 12A of the movable-side member 12 is greater than one-tenth of the thickness of the molded article 90, there is a possibility that the ejector pin 20 may bite into the molded article 90 to cause deterioration in mold releasing properties, or may inhibit the flow of the resin to cause a weld. In contrast, according to the injection mold 1 of the present embodiment, the difference in height in the sliding direction between the upper end surface 20A of the ejector pin 20 and the adjacent surface 12A of the movable-side member 12 is one-tenth or less of the thickness of the molded article 90, so that the possibility of occurrence of the above problem can be reduced.

The length L of the ejector pin 20 at the temperature Ta at the time of mold assembly can be represented by the following equation:

$$L \geq L1 + L2 + L1 \times (A-B) \times (Tm-Ta),$$

where the temperature at the time of mold assembly is Ta,
the temperature at the time of molding is Tm,
the linear expansion coefficient of the mold body 10 is A,
the linear expansion coefficient of each of the ejector pin 20 and the support member 30 is B,
the length of the ejector pin 20 at the temperature Ta at the time of mold assembly in a region where the linear expansion coefficient differs between the ejector pin 20 and the mold body 10 in the sliding direction (a region where the ejector pin 20 and the mold body 10 overlap in the sliding direction) is L1, and
the length of the ejector pin 20 at the temperature Ta at the time of mold assembly in a region where the linear expansion coefficient coincides between the ejector pin 20 and the support member 30 in the sliding direction (a region where the ejector pin 20 and the support member 30 overlap in the sliding direction) is L2.

By setting the length L of the ejector pin 20 in this manner, the end surface 20A of the ejector pin 20 can be made as high as or higher than the adjacent surface 12A of the movable-side member 12 at the temperature Tm at the time of molding. Therefore, when the molded article 90 is released by the ejector pin 20, the ejector pin 20 slides in a state where the side surface of the ejector pin 20 is in surface contact with the through hole 15 of the movable-side member 12 in which the ejector pin 20 slides, so that the occurrence of the wear 12C can be suitably prevented.

Hereinafter, with reference to FIGS. 5 to 10, a mechanism will be described in which the wear 12C occurs at the corner of the sliding surface of the movable-side member 12 with the ejector pin 20 intersecting with the adjacent surface 12A of the movable-side member 12 when the movable-side member is injection-molded by an injection mold 900 according to a comparative example. First, the configuration of the injection mold 900 according to the comparative example will be outlined. For ease of description, the components of the injection mold 900 according to the comparative example and those of the injection mold 1 according to the embodiment are denoted by the same reference numerals.

Figure 5:
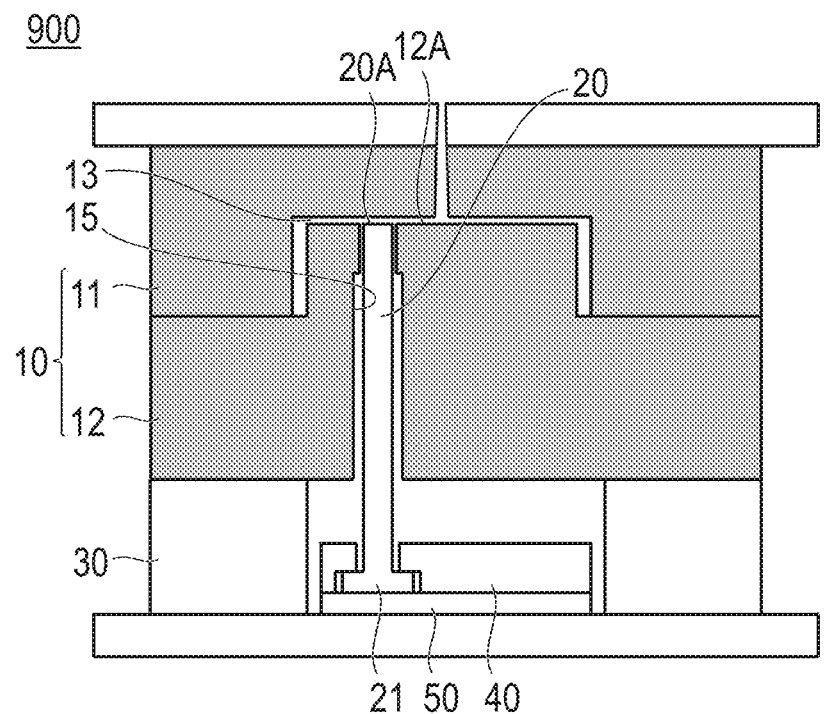
FIG. 5 is a schematic view illustrating an injection mold at a temperature at the time of mold assembly according to a comparative example.

In the injection mold 900 according to the comparative example, the end surface 20A of the ejector pin 20 is as high as the adjacent surface 12A of the movable-side member 12 at the temperature Ta at the time of mold assembly as illustrated in FIG. 5.

Figure 6:
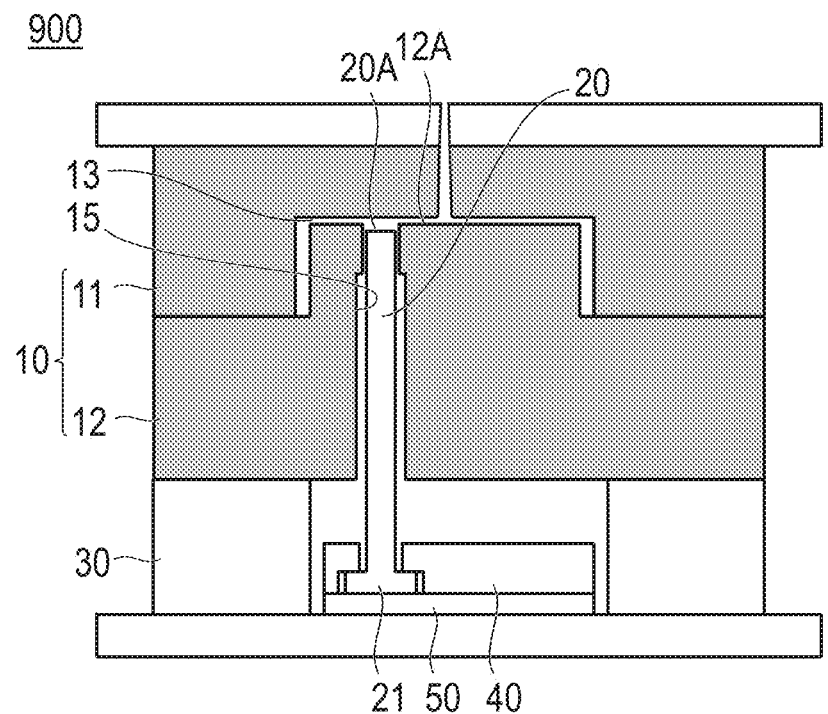
FIG. 6 is a schematic view illustrating the injection mold at a temperature at the time of molding according to the comparative example.

In the injection mold 900 according to the comparative example configured as thus described, when the temperature is raised to the temperature Tm at the time of molding, as illustrated in FIG. 6, the upper end surface 20A of the ejector pin 20 becomes lower than the adjacent surface 12A of the movable-side member 12 due to the difference in linear expansion coefficient between the mold body 10 and the ejector pin 20.

After the cavity 13 is filled with the resin in the molten state and the resin is cooled and solidified, the movable-side member 12 is moved downward and is separated downward from the fixed-side member 11 as illustrated in FIG. 7. Then, as illustrated in FIG. 8, the molded article 90 is released from the movable-side member 12 by sliding the ejector pin 20 upward.

Figure 9:
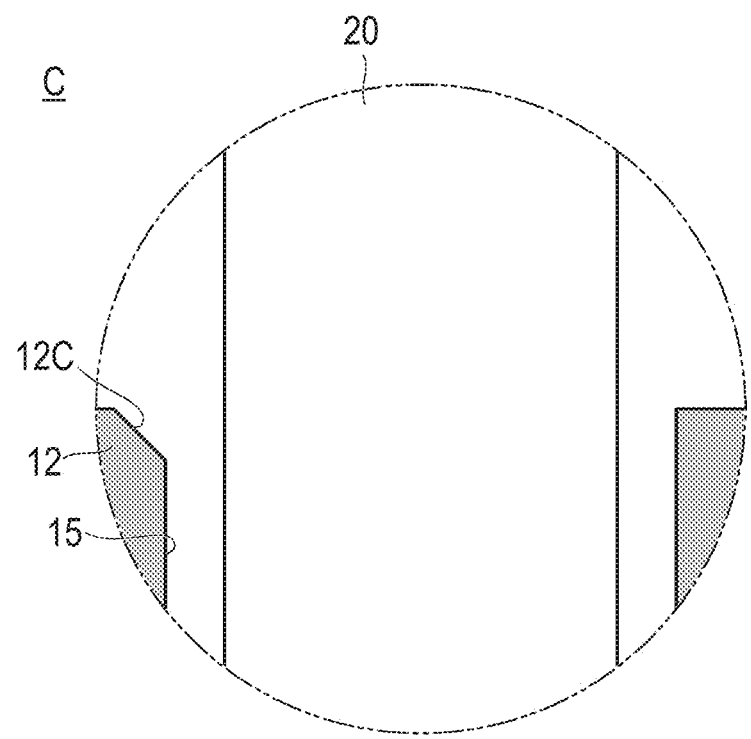
FIG. 9 is an enlarged view illustrating a section C in FIG. 8, and is a schematic view illustrating a state in which wear occurs when the injection mold according to the comparative example is used.
Figure 10:
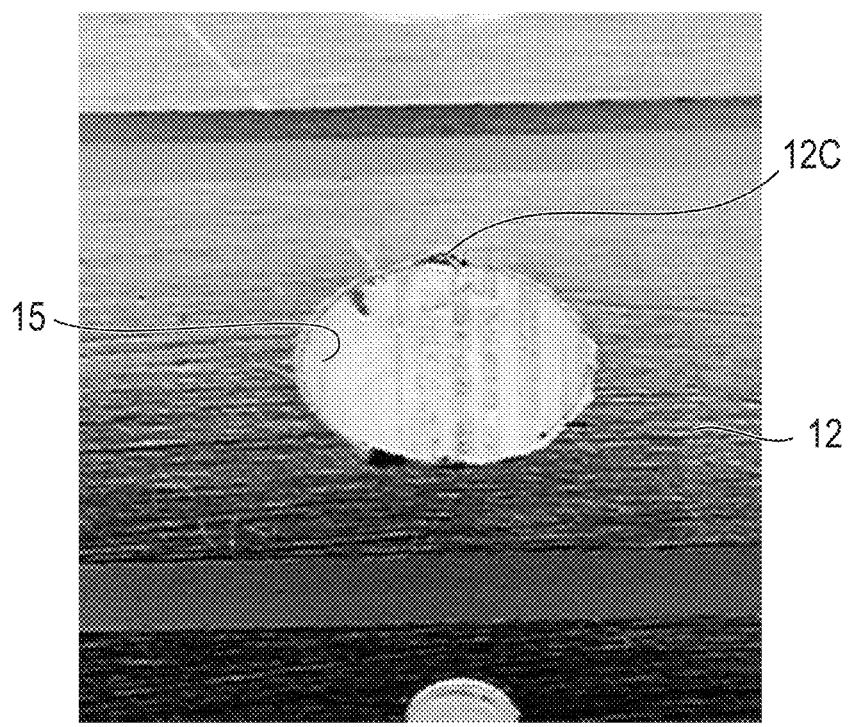
FIG. 10 is a photograph illustrating a state in which wear occurs when the injection mold according to the comparative example is used.

At this time, the outer periphery of the end surface 20A of the ejector pin 20 comes into contact with the corner of the movable-side member 12, and a large stress is locally applied to the corner of the movable-side member 12 to cause the wear 12C (cf. FIGS. 9 and 10).

In contrast, according to the injection mold 1 of the present embodiment, since the length L of the ejector pin 20 is set as described above, the occurrence of the wear 12C can be suitably reduced. Hereinafter, the configuration of the injection mold 1 according to the present embodiment will be described again.

As illustrated in FIG. 1, a lower end 21 of the ejector pin 20 is configured so as to have a greater diameter than the shaft body of the ejector pin 20. The lower end 21 is disposed to be sandwiched between an ejector pin pressing plate 40 and the ejector plate 50.

The ejector pin 20, the ejector pin pressing plate 40, and the ejector plate 50 are made of steel. The linear expansion coefficient of the steel is, for example, 11.6 to $13.4 \times 10^{-6}$/K.

As illustrated in FIG. 1, the support member 30 is disposed below the mold body 10 and supports the mold body 10. The ejector pin pressing plate 40 and an ejector plate 50 are disposed inside the support member 30. The support member 30 is also referred to as a spacer block.

The support member 30 is made of steel.

As described above, the injection mold 1 according to the present embodiment is the injection mold 1 having the mold body 10, which includes the fixed-side member 11 and the movable-side member 12 and in which the cavity 13 is formed, and the ejector pin 20. The mold body 10 and the ejector pin 20 have linear expansion coefficients different from each other. At the temperature Tm at the time of molding, the end surface 20A on the cavity 13 side in the sliding direction of the ejector pin 20 is as high as or higher than the adjacent surface 12A of the movable-side member 12 which is adjacent to the cavity 13. According to the injection mold 1 configured as thus described, at the temperature Tm at the time of molding, the end surface 20A of the ejector pin 20 is as high as or higher than the adjacent surface 12A of the movable-side member 12. Therefore, when the molded article 90 is released by the ejector pin 20, the ejector pin 20 slides in a state where the side surface of the ejector pin 20 is in surface contact with the through hole 15 of the movable-side member 12 in which the ejector pin 20 slides, so that the occurrence of the wear 12C can be suitably prevented. Further, since the injection mold 1 is not subjected to any special treatment such as alumite treatment, a low cost can be achieved and a change in mold size can be reduced.

Example of Injection Mold According to Embodiment

Hereinafter, the present invention will be described more specifically with reference to examples, but the present invention is not limited thereto.

<Materials>

An aluminum alloy JIS-A7075 was used as the fixed-side member 11 and the movable-side member 12. The linear expansion coefficient of the aluminum alloy JIS-A7075 is $23.6 \times 10^{-6}$/K. S55C was used as the support member 30 and the ejector plate 50. The linear expansion coefficient of S55C is $11.7 \times 10^{-6}$/K. SKD 61 was used as the ejector pin 20. The linear expansion coefficient of SKD61 is $11.6 \times 10^{-6}$/K.

<Temperature Specifications>

Next, temperature specifications will be described. The temperature Tm at the time of molding was set to 70° C. The temperature Ta at the time of mold assembly was set to 20° C.

<Molded Article>

Next, specifications of the molded article will be described below. Polyoxymethylene (POM) was used as the resin of the molded article. As the thickness of the molded article, 2 mm was employed.

<Ejector Pin Thickness in Sliding Direction (Dimensions at Mold Temperature at Time of Mold Assembly)>

The length from the bottom surface of the movable-side member 12 to the adjacent surface 12A was set to 150 mm. The thickness of the support member 30 was set to 50 mm. The thickness of the ejector plate 50 was set to 10 mm.

At this time, the distance from the upper surface of the ejector plate 50 to the adjacent surface 12A of the movable-side member 12 was: 150 mm+50 mm−10 mm=190 mm.

At this time, the length L1 of the ejector pin 20 at the temperature Ta at the time of mold assembly in the region where the linear expansion coefficient differs between the ejector pin 20 and the mold body 10 in the sliding direction was 150 mm. Further, the length L2 of the ejector pin 20 at the temperature Ta at the time of mold assembly in the region where the linear expansion coefficient coincides between the ejector pin 20 and the support member 30 in the sliding direction was 40 mm.

At this time, since the length L of the ejector pin 20 is set to: $L \geq L1+L2+L1 \times (A-B) \times (Tm-Ta)$ as described above, $L \geq 150+40+150 \times (23.6 \times 10^{-6} - 11.6 \times 10^{-6}) \times (70-20) = 190.09$ mm, and the length L of the ejector pin 20 was set to 190.1 mm.

<Ejector Pin Thickness in Sliding Direction (Dimensions at Molding Temperature)>

By raising the temperature to the temperature Tm at the time of molding, the length from the bottom surface of the movable-side member 12 to the adjacent surface 12A became: $150+150 \times 23.6 \times 10^{-6} \times (70-20) = 150.177$ mm.

As the temperature was raised to the temperature Tm at the time of molding, the thickness of the support member 30 became: $50+50 \times 11.6 \times 10^{-6} \times (70-20) = 50.029$ mm As the temperature was raised to the temperature Tm at the time of molding, the thickness of the ejector plate 50 became: $10+10 \times 11.6 \times 10^{-6} \times (70-20) = 10.006$ mm As a result, the distance from the upper surface of the ejector plate 50 to the adjacent surface 12A of the movable-side member 12 when the temperature is raised to the temperature Tm at the time of molding became: 150.177+50.029−10.006=190.2 mm.

As the temperature was raised to the temperature Tm at the time of molding, the length L of the ejector pin 20 became: $190.1+190.1 \times 11.6 \times 10^{-6} \times (70-20) = 190.21$ mm.

Thus, the ejector pin 20 can release the molded article 90 in a state where the end surface 20A of the ejector pin 20 protrudes upward by 0.01 mm from the adjacent surface 12A of the movable-side member 12. Therefore, when the molded article 90 is released by the ejector pin 20, the ejector pin 20 slides in a state where the side surface of the ejector pin 20 is in surface contact with the through hole 15 of the movable-side member 12 in which the ejector pin 20 slides, so that the occurrence of the wear 12C can be suitably prevented.

Here, for example, when the length of the ejector pin 20 is designed to be 190 mm, there is a possibility that the wear 12C may occur because the ejector pin is recessed by 0.09 mm from the adjacent surface 12A of the movable-side member 12 at the temperature Tm at the time of molding.

<First Modification>

Figure 11:
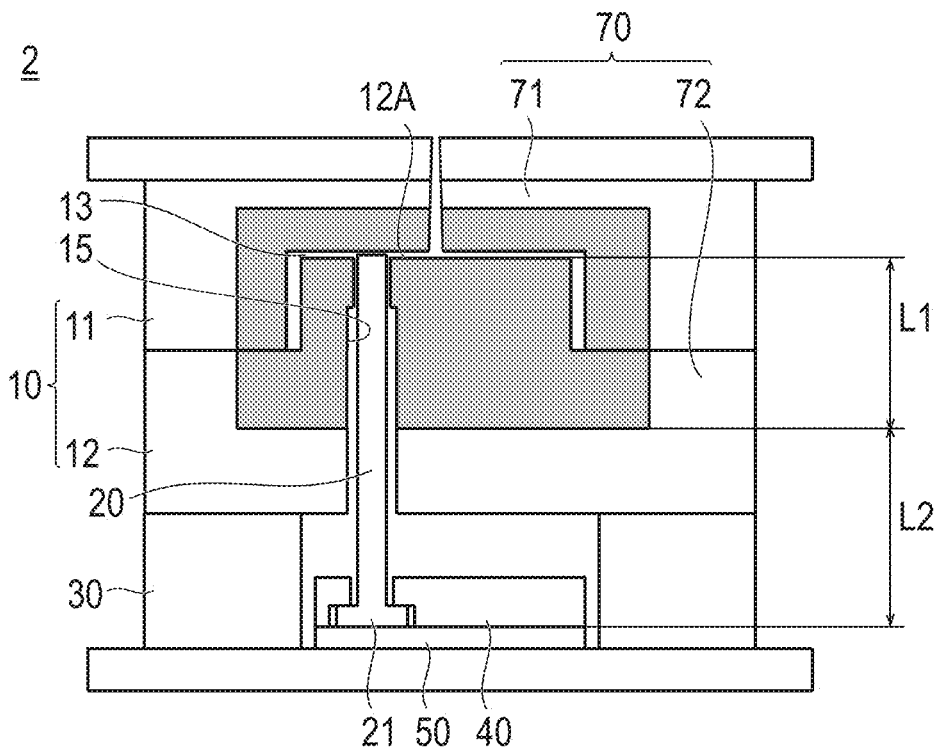
FIG. 11 is a schematic view illustrating an injection mold at a temperature at the time of mold assembly according to a first modification.

Next, a configuration of an injection mold 2 according to the first modification will be described with reference to FIG. 11. FIG. 11 is a schematic view illustrating the injection mold 2 at the temperature Ta at the time of mold assembly according to the first modification.

The injection mold 2 according to the first modification differs from the injection mold 1 according to the embodiment described above in that the mold body 10 is configured to be nested. The same components as those of the injection mold 1 according to the above embodiment are denoted by the same reference numerals and description thereof will be omitted.

The injection mold 2 according to the first modification has a mold body 10, an ejector pin 20, a support member 30, and a template portion 70 disposed to cover the mold body 10. The configurations of the mold body 10, the ejector pin 20, and the support member 30 are the same as those of the embodiment described above, and hence descriptions thereof will be omitted.

As illustrated in FIG. 11, the template portion 70 includes a fixed template 71 disposed to cover the fixed-side member 11, and a movable template 72 disposed to cover the movable-side member 12.

The fixed template 71 and the movable template 72 are made of steel.

In the injection mold 2 according to the first modification, the length L1 of the ejector pin 20 at the temperature Ta at the time of mold assembly in the region where the linear expansion coefficient differs between the ejector pin 20 and the mold body 10 in the sliding direction is as illustrated in FIG. 11.

In the injection mold 2 according to the first modification, the length L2 of the ejector pin 20 at the temperature Ta at the time of mold assembly in the region where the linear expansion coefficient coincides in the sliding direction among the ejector pin 20, the support member 30, and the template portion 70 is as illustrated in FIG. 11.

At this time, the length L of the ejector pin 20 at the temperature Ta at the time of mold assembly can be expressed by the following equation:

$$L \geq L1+L2+L1 \times (A-B) \times (Tm-Ta)$$

According to the injection mold 2 configured as thus described, similarly to the injection mold 1 according to the embodiment described above, the end surface 20A of the ejector pin 20 can be made as high as or higher than the adjacent surface 12A of the movable-side member 12 at the temperature Tm at the time of molding. Therefore, when the molded article 90 is released by the ejector pin 20, the ejector pin 20 slides in a state where the side surface of the ejector pin 20 is in surface contact with the through hole 15 of the movable-side member 12 in which the ejector pin 20 slides, so that the occurrence of the wear 12C can be suitably prevented.

<Second Modification>

Figure 12:
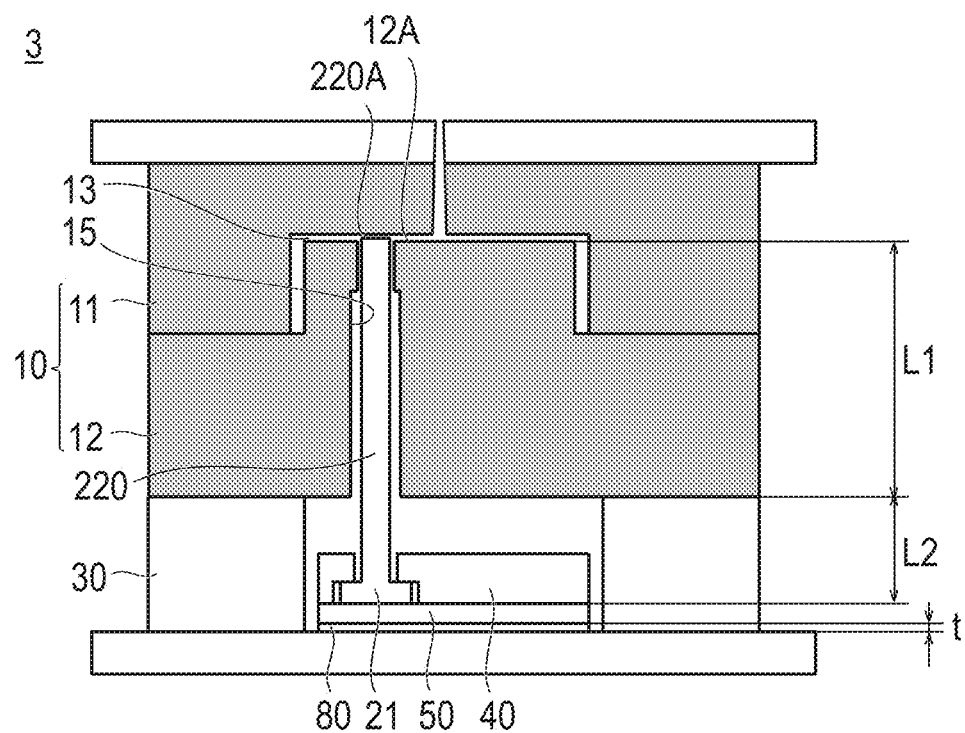
FIG. 12 is a schematic view illustrating an injection mold at a temperature at the time of mold assembly according to a second modification.

Next, a configuration of an injection mold 3 according to a second modification will be described with reference to FIG. 12. FIG. 12 is a schematic view illustrating the injection mold 3 at the temperature Ta at the time of mold assembly according to the second modification.

The injection mold 3 according to the second modification differs from the injection mold 1 according to the embodiment described above in the length of an ejector pin 220 and that a spacer 80 is provided below the ejector plate 50. The same components as those of the injection mold 1 according to the above embodiment are denoted by the same reference numerals and description thereof will be omitted.

As illustrated in FIG. 12, the injection mold 2 according to the second modification has a mold body 10, an ejector pin 220, a support member 30, and the spacer 80. The configurations of the mold body 10 and the support member 30 are the same as those of the embodiment described above, and hence descriptions thereof will be omitted.

In the second modification, the length L of the ejector pin 220 is set to be: L=L1+L2.

The spacer 80 is disposed below the ejector plate 50 to be adjacent thereto. A thickness t of the spacer 80 is set to be expressed by the following equation.

$$t \geq L1 \times (A-B) \times (Tm-Ta)$$

Here, for example, when it is configured such that the spacer 80 is not provided, since the length L of the ejector pin 220 is set to be L1+L2, an upper end surface 220A of the ejector pin 220 becomes lower than the adjacent surface 12A of the movable-side member 12 at the temperature Tm at the time of molding. Therefore, there is a possibility that wear 12C may occur in the movable-side member 12.

In contrast, according to the injection mold 3 of the second modification, the end surface 220A of the ejector pin 220 can be moved upward by the spacer 80 with the thickness t set by the above equation.

Therefore, the end surface 220A of the ejector pin 220 can be made the same height or higher than the adjacent surface 12A of the movable-side member 12 at the temperature Tm at the time of molding, so that the occurrence of the wear 12C can be suitably reduced.

Figure 13:
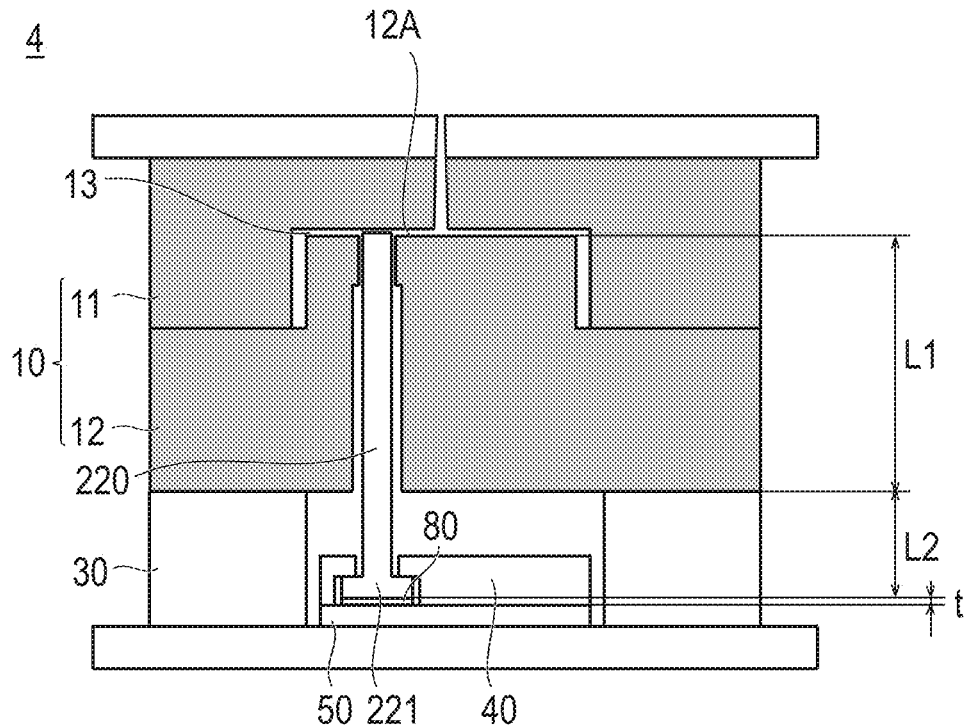
FIG. 13 is a schematic view illustrating an injection mold at a temperature at the time of mold assembly according to a modification.

FIG. 13 is a schematic view illustrating an injection mold 4 at the temperature Ta at the time of mold assembly according to the second modification. The position where the spacer 80 is provided is not limited to being below the ejector plate 50 illustrated in FIG. 12, but may be above the ejector plate 50 and between the ejector plate 50 and a lower end 221 of the ejector pin 220 as illustrated in FIG. 13.

Example of Injection Mold According to Second Modification

Hereinafter, the second modification will be described more specifically with reference to the examples, but the present invention is not limited thereto.

The material, temperature specifications, and molded article are the same as the examples of the injection mold 1 according to the embodiment described above, and hence descriptions thereof will be omitted.

The length from the bottom surface of the movable-side member 12 to the adjacent surface 12A was set to 150 mm. The thickness of the support member 30 was set to 50 mm. The thickness of the ejector plate 50 was set to 10 mm.

At this time, the distance from the upper surface of the ejector plate 50 to the adjacent surface 12A of the movable-side member 12 was: 150 mm+50 mm−10 mm=190 mm.

The length of the ejector pin 220 was set to 190 mm at the temperature Ta at the time of mold assembly. When the temperature is raised to the temperature Tm at the time of molding, without the spacer 80, the end surface 220A of the ejector pin 220 is recessed downward by 0.09 mm with respect to the adjacent surface 12A of the movable-side member 12 as described in the example of the injection mold 1 according to the above embodiment. Assuming this, the spacer 80 with a thickness of 0.1 mm as the thickness t was used. As a result, the height of the ejector plate 50 is raised, and the end surface 220A of the ejector pin 220 comes into the state of projecting from the adjacent surface 12A of the movable-side member 12 by 0.01 mm.

At this time, the thickness corresponding to L2 is reduced by 0.1 mm, whereby at the temperature Ta at the time of mold assembly, the length of the ejector pin 220 is 190 mm while the distance from the upper surface of the ejector plate 50 to the adjacent surface 12A of the movable-side member 12 is 189.9 mm, and hence the occurrence of the wear 12C can be prevented as in the injection mold 1 according to the embodiment described above.

<Third Modification>

Figure 14:
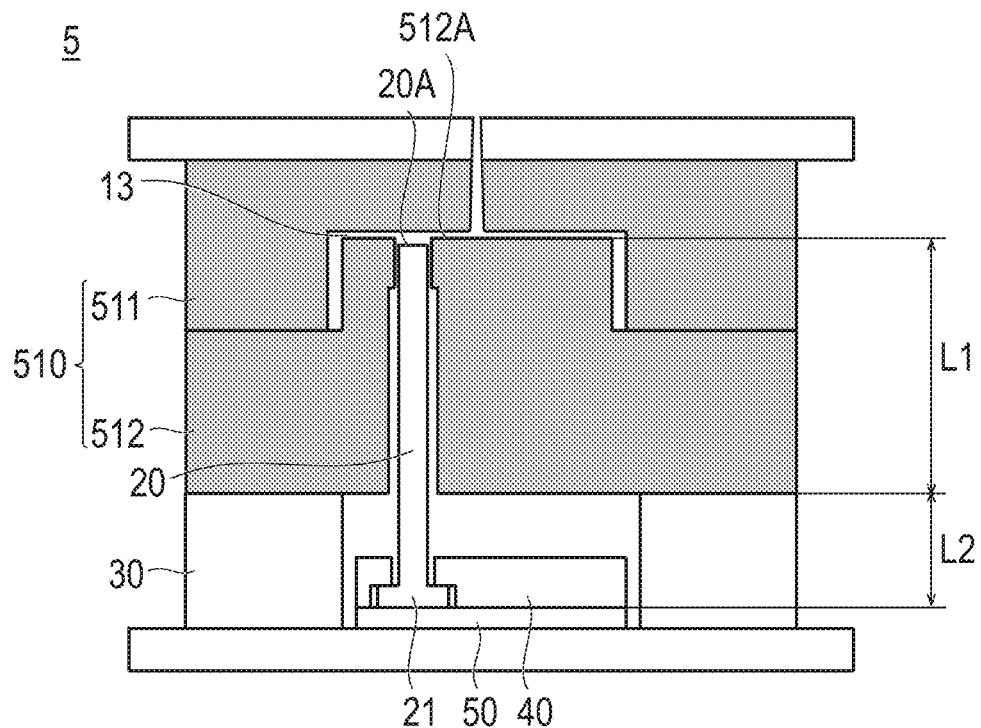
FIG. 14 is a schematic view illustrating an injection mold at a temperature at the time of mold assembly according to a third modification.

Next, a configuration of an injection mold 5 according to a third modification will be described with reference to FIG. 14. FIG. 14 is a schematic view illustrating the injection mold 5 at the temperature Ta at the time of mold assembly according to the third modification.

The injection mold 5 according to the third modification differs from the injection mold 1 according to the embodiment described above in a material constituting a mold body 510. The same components as those of the injection mold 1 according to the above embodiment are denoted by the same reference numerals and description thereof will be omitted.

The injection mold 5 according to the third modification has the mold body 510, an ejector pin 20, and a support member 30. The configurations of the ejector pin 20 and the support member 30 are the same as those of the embodiment described above, and hence descriptions thereof will be omitted.

As illustrated in FIG. 14, the mold body 510 has a fixed-side member 511 disposed above, and a movable-side member 512 disposed below the fixed-side member 511.

The fixed-side member 511 and the movable-side member 512 are made of cemented carbide. The linear expansion coefficient of the cemented carbide is, for example, $5.0 \times 10^{-6}$/K.

In the injection mold 5 configured as thus described, since the linear expansion coefficient of the mold body 510 is lower than the linear expansion coefficient of the steel constituting the ejector pin 20 and the support member 30, the ejector pin 20 extends in the vertical direction more than the mold body 510 by raising the temperature to the temperature Tm at the time of molding. Therefore, the end surface 20A of the ejector pin 20 can be set at a position lower than the adjacent surface 512A of the movable-side member 512 at the temperature Ta at the time of mold assembly.

At this time, similarly to the injection mold 1 according to the above embodiment, the length L of the ejector pin 20 at the temperature Ta at the time of mold assembly can be represented by the following equation:

$$L \geq L1+L2+L1 \times (A-B) \times (Tm-Ta),$$

where the temperature at the time of mold assembly is Ta, the temperature at the time of molding is Tm, the linear expansion coefficient of the mold body 510 is A, the linear expansion coefficient of each of the ejector pin 20 and the support member 30 is B, the length of the ejector pin 20 at the temperature at the time of mold assembly in a region where the linear expansion coefficient differs between the ejector pin 20 and the mold body 510 in the sliding direction is L1, and the length of the ejector pin 20 at the temperature at the time of mold assembly in a region where the linear expansion coefficient coincides between the ejector pin 20 and the support member 30 in the sliding direction is L2.

By setting the length of the ejector pin 20 in this manner, the temperature is raised to the temperature Tm at the time of molding, so that the end surface 20A of the ejector pin 20 can be made higher than an adjacent surface 512A of a movable-side member 512. Hence the occurrence of wear can be prevented.

Example of Injection Mold According to Third Modification

Hereinafter, the third modification will be described more specifically with reference to the examples, but the present invention is not limited thereto.

<Materials>

As the fixed-side member 511 and the movable-side member 512, cemented carbide was used. The linear expansion coefficient of the cemented carbide is $5.0 \times 10^{-6}$/K. SKD61 was used as the support member, the ejector pin, and the ejector plate. The linear expansion coefficient of SKD61 is $11.6 \times 10^{-6}$/K.

<Temperature Specifications>

Next, temperature specifications will be described. The temperature Tm at the time of molding was set to 130° C. The temperature Ta at the time of mold assembly was set to 20° C.

<Molded Article>

Next, specifications of the molded article will be described below. Polycarbonate (PC) was used as the resin of the molded article. As the thickness of the molded article, 2 mm was employed.

<Ejector Pin Thickness in Sliding Direction (Dimensions at Mold Temperature at Time of Mold Assembly)>

The length from the bottom surface of the movable-side member 512 to the adjacent surface 512A was set to 150 mm. The thickness of the support member 30 was set to 50 mm. The thickness of the ejector plate 50 was set to 10 mm.

At this time, the distance from the upper surface of the ejector plate 50 to the adjacent surface 512A of the movable-side member 512 was: 150 mm+50 mm−10 mm=190 mm.

At this time, the length L1 of the ejector pin 20 at the temperature at the time of mold assembly in the region where the linear expansion coefficient differs between the ejector pin 20 and the mold body 510 in the sliding direction was 150 mm. Further, the length L2 of the ejector pin 20 at the temperature at the time of mold assembly in the region where the linear expansion coefficient coincides between the ejector pin 20 and the support member 30 in the sliding direction was 40 mm.

At this time, since the length L of the ejector pin 20 is: $L \geq L1+L2+L1 \times (A-B) \times (Tm-Ta)$ as described above, $L \geq 150+40+150 \times (5.0 \times 10^{-6} - 11.6 \times 10^{-6}) \times (130-20) = 189.891$ mm, and the length L of the ejector pin 20 was set to 189.9 mm.

<Ejector Pin Thickness in Sliding Direction (Dimensions at Molding Temperature)>

As the temperature was raised to the temperature Tm at the time of molding, the length from the bottom surface of the movable-side member 512 to the adjacent surface 512A became: $150+150 \times 5.0 \times 10^{-6} \times (130-20) = 150.083$ mm.

As the temperature was raised to the temperature Tm at the time of molding, the thickness of the support member 30 became: $50+50 \times 5.0 \times 10^{-6} \times (130-20) = 50.064$ mm As the temperature was raised to the temperature Tm at the time of molding, the thickness of the ejector plate 50 became: $10+10 \times 5.0 \times 10^{-6} \times (130-20) = 10.013$ mm.

The distance from the upper surface of the ejector plate 50 to the adjacent surface 512A of the movable-side member 512 when the temperature was raised to the temperature Tm at the time of molding became: 150.083+50.064−10.013=190.134 mm.

As the temperature was raised to the temperature Tm at the time of molding, the length of the ejector pin 20 became: $189.9+189.9 \times 5.0 \times 10^{-6} \times (130-20) = 190.142$ mm.

Thus, the ejector pin 20 releases the molded article 90 in a state where the end surface 20A of the ejector pin 20 protrudes upward by 0.008 mm from the adjacent surface 512A of the movable-side member 512, so that the occurrence of wear can be suitably reduced.

The present invention is not limited to the embodiment described above, and various modifications can be made within the scope of the claims.

Although embodiments of the present invention have been described and illustrated in detail, the disclosed embodiments are made for purpose of illustration and example only and not limitation. The scope of the present invention should be interpreted by terms of the appended claims

What is claimed is:
1. An injection mold comprising:
a mold body that includes a fixed-side member and a movable-side member and in which a cavity is formed; and an ejector pin,
wherein said mold body and said ejector pin have linear expansion coefficients different from each other,
at a temperature at a time of molding,
an end surface of said ejector pin on said cavity side in a sliding direction is as high as or higher than an adjacent surface of said movable-side member, said adjacent surface being adjacent to said cavity,
the injection mold further comprises:
a support member that supports said mold body and has the same linear expansion coefficient as the linear expansion coefficient of said ejector pin; and
a spacer that is provided below said ejector pin, adjusts a height of said end surface of said ejector pin, and has the same linear expansion coefficient as the linear expansion coefficient of said ejector pin,
wherein a thickness t of said spacer is:

$$t \geq L1 \times (A-B) \times (Tm-Ta),$$

where a temperature at a time of mold assembly is Ta, the temperature at the time of molding is Tm, the linear expansion coefficient of said mold body is A, the linear expansion coefficient of each of said ejector pin, said support member, and said spacer is B, a length of said ejector pin at the temperature at the time of mold assembly in a region where the linear expansion coefficient differs between said ejector pin and said mold body in said sliding direction is L1, and a length of said ejector pin at the temperature at the time of mold assembly in a region where the linear expansion coefficient coincides between said ejector pin and said support member in said sliding direction is L2.

2. An injection mold comprising:
a mold body that includes a fixed-side member and a movable-side member and in which a cavity is formed; and an ejector pin,
wherein said mold body and said ejector pin have linear expansion coefficients different from each other,
at a temperature at a time of molding,
an end surface of said ejector pin on said cavity side in a sliding direction is as high as or higher than an adjacent surface of said movable-side member, said adjacent surface being adjacent to said cavity,
the injection mold further comprises a support member that supports said mold body and has the same linear expansion coefficient as the linear expansion coefficient of said ejector pin, and
a length L of said ejector pin at a temperature at a time of mold assembly is:

$$L \geq L1+L2+L1 \times (A-B) \times (Tm-Ta),$$

where the temperature at the time of mold assembly is Ta, the temperature at the time of molding is Tm, the linear expansion coefficient of said mold body is A, the linear expansion coefficient of each of said ejector pin and said support member is B, a length of said ejector pin at the temperature at the time of mold assembly in a region where the linear expansion coefficient differs between said ejector pin and said mold body in said sliding direction is L1, and a length of said ejector pin at the temperature at the time of mold assembly in a region where the linear expansion coefficient coincides between said ejector pin and said support member in said sliding direction is L2.

3. The injection mold according to claim 2,
wherein said mold body and said ejector pin are different from each other in linear expansion coefficient by $2 \times 10^{-6}$/K or more.

4. The injection mold according to claim 2,
wherein said end surface of said ejector pin is higher than said adjacent surface of said movable-side member at a temperature at a time of mold assembly.

5. The injection mold according to claim 2,
wherein, when said end surface of said ejector pin is higher than said adjacent surface of said movable-side member at the temperature at the time of molding,
a difference in height in said sliding direction between said end surface of said ejector pin and said adjacent surface of said movable-side member is one-tenth or less of a thickness of a molded article.

6. The injection mold according to claim 2,
wherein said mold body is made of an aluminum alloy, and said ejector pin is made of steel.

7. The injection mold according to claim 2,
wherein the injection mold is used for manufacturing of a part of an image forming apparatus.

8. A manufacturing method of manufacturing a molded article by using the injection mold according to claim 2.

* * * * *